Patented Nov. 15, 1938

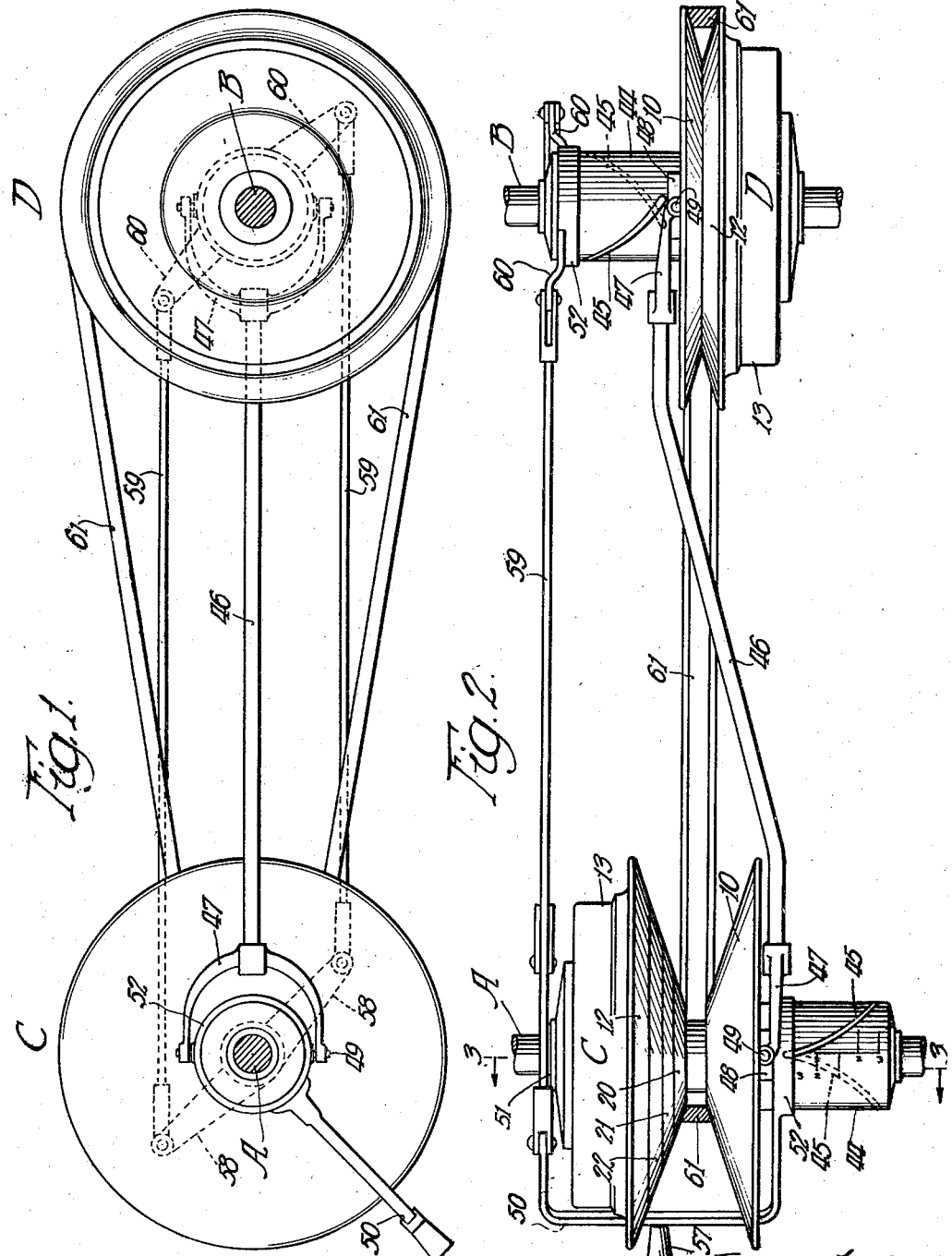

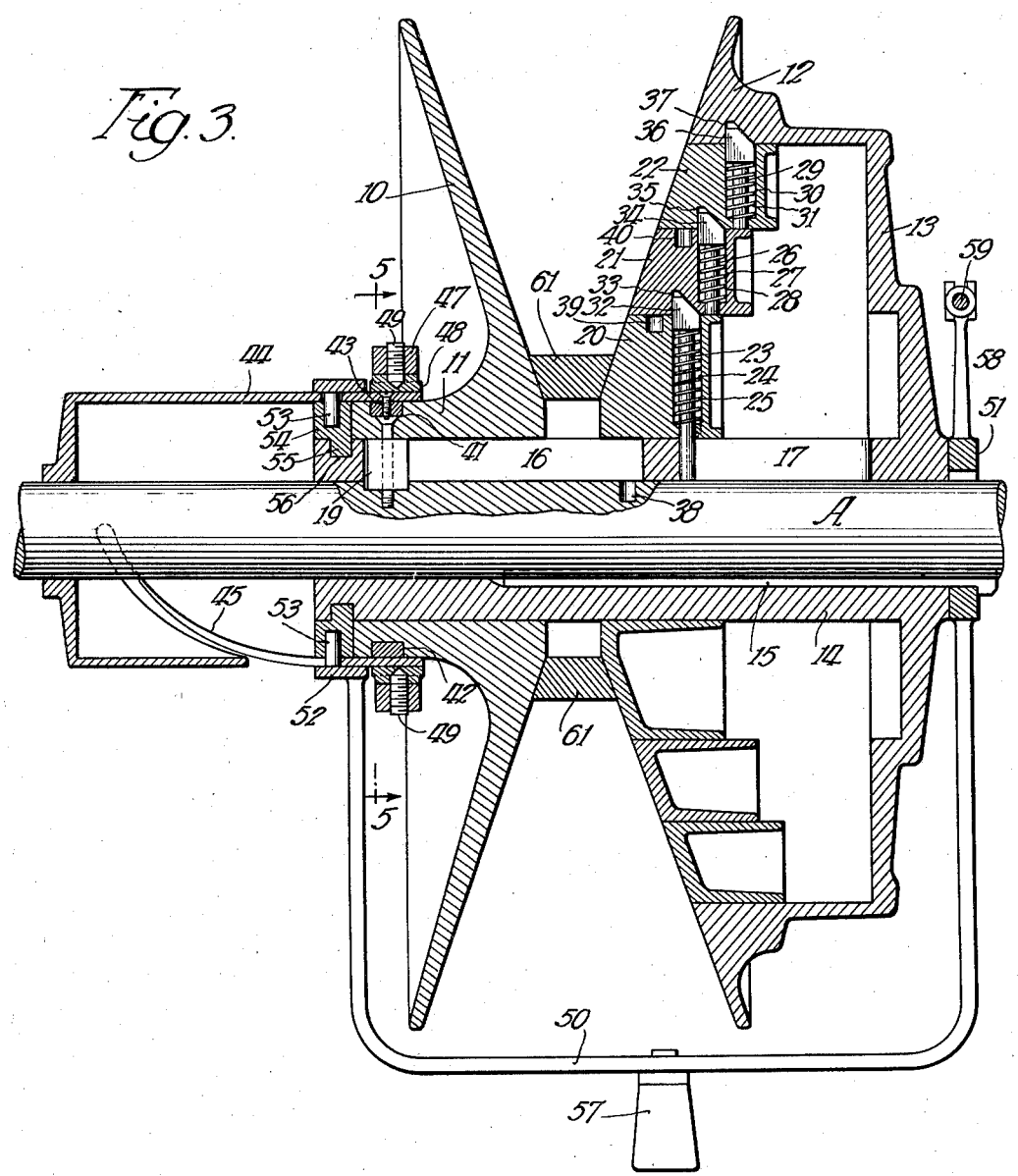

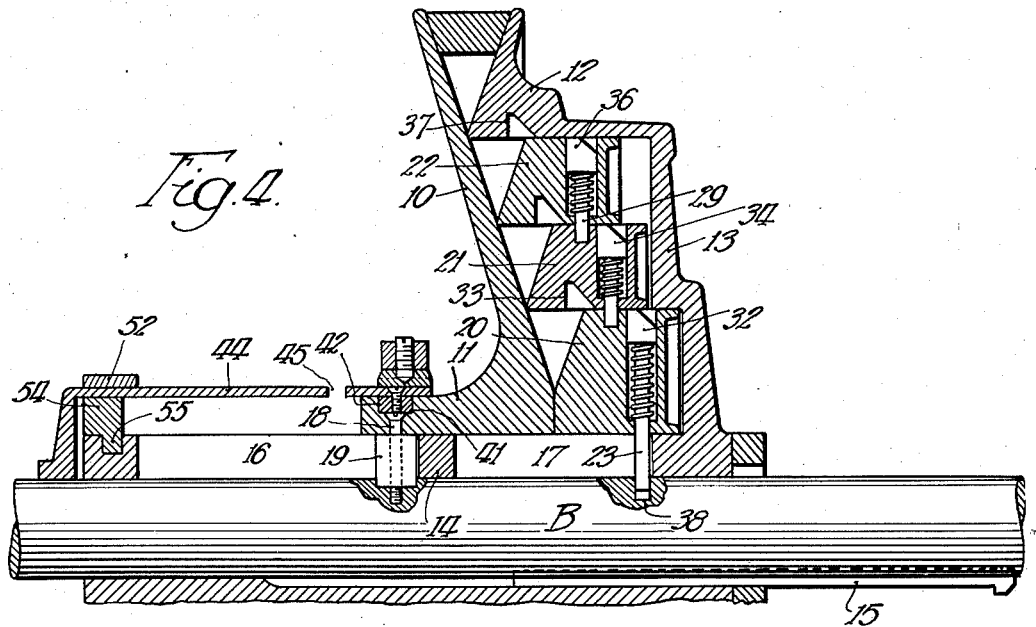
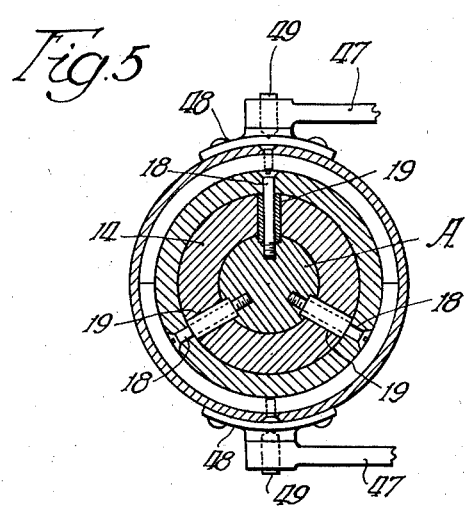
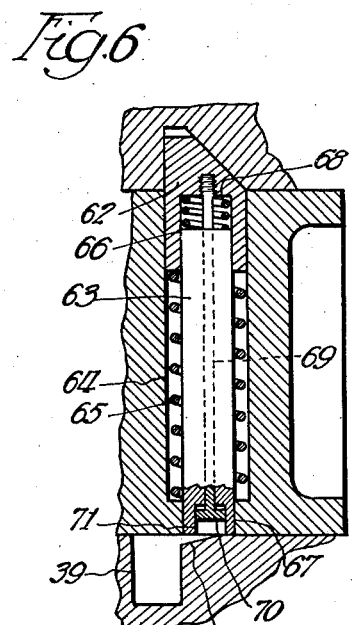

2,136,437

UNITED STATES PATENT OFFICE 2,136,437

VARIABLE SPEED TRANSMISSION

Jan H. Hollestelle, Evanston, Ill., assignor, by mesne assignments, to U. S. Electrical Motors, Inc., a corporation of California Application March 14, 1931, Serial No. 522,591
Renewed September 29, 1937

12 Claims. (Cl. 74—230.17)

This invention relates to variable speed transmissions of the cone-pulley type. Variable speed transmissions of this type generally consist of a pair of pulleys and a connecting belt, each pulley consisting of a pair of oppositely facing cones (i. e. tapered sections or disks) keyed or splined on a shaft, with one of the cones slidable toward and from the other, thus creating a V-shaped groove which is narrowed or widened by bodily shifting one of the cones toward or from the other. The belt that connects the two pulleys has beveled or tapered edges which frictionally engage with the faces of the two cones forming each pulley, and means are provided for simultaneously expanding one pulley and contracting the other, whereby the effective radius of one pulley is lengthened and that of the other is correspondingly shortened.

Heretofore, in variable speed transmissions of this type, in order to obtain a substantial increase or reduction of speed it has been necessary to either employ a very wide belt, or to make the inclined faces of the cone sections of the pulley very steep. The main trouble with a wide belt is the tendency to flap edge ways, or to climb the sides of the pulleys. Also, where a wide belt is employed the latter has to be so made as to possess a high degree of transverse rigidity to prevent transverse buckling or bending under the compressive strain on the edges of the belt; and where the cone faces are steep, it is difficult to cam the end loop of the belt outwardly when shifting the cone sections of the pulley toward each other owing to the steepness of the cam.

One object of my present invention is to provide an improved variable speed transmission of the type referred to which will permit the use of a narrow belt and also a very long belt between pulleys a long distance apart. To accomplish this, I construct the laterally movable member of the pulley in a plurality of concentric ring-shaped inter-nested sections, with means for locking them together and means for shifting them successively toward the opposed member of the pulley and automatically locking them in such shifted position, whereby said sections may be successively brought into cooperation with the connector belt.

Other objects of the invention are, to provide an improved mechanism for moving the laterally shiftable cone toward and from its mating cone, to provide an improved mechanism whereby the shiftable cones of the two pulleys are simultaneously moved in opposite directions relatively to their mating cones from a single operating handle or lever when varying the speed, to provide an improved means for locking stationary the two cams through which the shifting is effected, to provide novel and efficient automatic locking means between the annular sections of the laterally shiftable cone, and to provide improved means for locking each pulley to its shaft.

Still other objects and attendant advantages of the invention will become apparent to persons skilled in the art as the same becomes better understood by reference to the following detailed description, taken in connection with the accompanying drawings in which I have illustrated a practical and workable embodiment of the invention, and wherein—

Fig. 1 is a side elevational view of the apparatus.

Fig. 2 is a top plan view.

Fig. 3 is an enlarged sectional view through one of the pulleys and its mounting means, showing the annular sections of the shiftable cone in outer position and the drive belt at the inner periphery.

Fig. 4 is a view similar to Fig. 3 showing the annular sections of the shiftable cone in their innermost position, with the drive belt at the outer periphery.

Fig. 5 is a transverse section taken on the line 5—5 of Fig. 3.

Fig. 6 is an enlarged sectional detail showing a modified construction of automatic locking pin.

Referring to Figs. 1 and 2 of the drawings, A and B designate a pair of parallel shafts, either of which may be the driving shaft and the other the driven shaft. On these shafts are mounted expanding pulleys designated as entireties by C and D, respectively. Inasmuch as these expanding pulleys and their operating means are identical, except that they are preferably relatively inverted endwise as shown in Fig. 2, a description of one will suffice for both.

Referring to Figs. 3 and 4, 10 designates one of the cone-shaped sections of the pulley formed with a hub 11. The working face of the other cone-shaped section of the pulley is made up of a plurality of concentric inter-nested rings, of which the outermost is designated by 12. Integral or otherwise fast with the ring 12 is a hollow cup-shaped web 13 and a long sleeve-like hub 14 that is splined on the shaft by a key 15 so as to be slidable lengthwise of the shaft. The hub 11 of the pulley section 10 is mounted on the sleeve 14. The sleeve 14 is formed with longitudinal slots 16 and 17, and the hub 11 is locked to the shaft by a group of pins 18, Fig. 5, that extend through the slots 16 and through spacing sleeves 19 that prevent clamping of the hub 11 on the hub 14 and thus serve to maintain an easy sliding fit for the hub 14 through the hub 11.

Concentrically nested within the outer ring 12 and its web 13 are a group of independently shiftable rings 20, 21 and 22, the inner faces of which are tapered, as clearly shown in Fig. 3, to conform to the taper of the inner face of ring 12, so that in the outermost position shown in Fig. 3 the tapered faces of the rings 12, 20, 21 and 22 form a continuous tapered or conical surface matching that of the opposed pulley section 10.

The ring sections 20, 21 and 22 are equipped with spring actuated locking pins which cooperate with recesses or notches in the ring sections 21, 22 and 12, respectively, to normally maintain the ring sections in their outermost positions shown in Fig. 3. More specifically describing these features, 23 designates a locking pin mounted in a socket 24 in the ring 20 and normally thrust outwardly by a spring 25. 26 designates a similar locking pin mounted in a socket 27 in the ring 21 and normally thrust outwardly by a spring 28; and 29 designates a similar locking pin mounted in a recess 30 in the ring 22 and normally thrust outwardly by a spring 31. The locking pin 23 has a beveled head 32 that enters a correspondingly shaped socket 33 in the ring 21; the locking pin 26 has a beveled head 34 that enters a correspondingly shaped socket 35 in the ring 22; and the locking pin 29 has a beveled head 36 that enters a correspondingly shaped socket 37 in the ring 12. As the outer ring 12 is moved inwardly, by means hereinafter described, the three inner rings 22, 21 and 20 move inwardly with it until the lower end of the locking pin 23 registers with a hole 38 in the shaft A, whereupon the socket 33 of the ring 21, acting upon the beveled head 32 of the pin, cams the lower end of the pin into the hole 38, as shown in Fig. 4. Under a further inward movement of the rings 12, 22 and 21, the lower end of locking pin 26 is forced into a similar hole 39 in the outer side of ring 20 by the camming action of the recess 35 on the head 34. Under a still further inward movement of the rings 12 and 22, the lower end of locking pin 29 is forced into a similar hole 40 in the ring 21 under the camming action of the recess 37 on the head 36, and under a still further inward movement of the ring 12, the inner periphery of the latter approaches and contacts with the tapered face of the cone section 10, all as clearly shown in Fig. 4. Manifestly in this position of the parts the three rings 20, 21 and 22 are all locked to each other, and this is also the case in the expanded position of the same rings shown in Fig. 3. It may here be remarked that in practice the several locking pins 23, 26 and 29 are disposed in different radial planes, but, of course, the pin 26 is in the same radial plane with its cooperating hole 39, and the pin 29 is in the same radial plane with its cooperating hole 40; and while I have illustrated but a single series of locking pins, there may be, of course, several series of locking pins spaced around the axis of the shaft.

Describing next the mechanism for effecting the expanding and contracting movements of the two pulleys, fitted within an annular groove 41 of the hub 11 is a ring 42, to which ring is attached, as by screws 43, the inner end of a hollow cylinder or drum 44, the outer closed end 75 of said drum being mounted on the shaft. In the surface of said drum are cam slots 45. The two drums 44 are maintained stationary by any suitable means, that herein shown consisting of a steadying bar 46 (Figs. 1 and 2) equipped at each end with a fork 47 that, as shown in Fig. 5 3 straddles a pair of ring segments 48 (Fig. 5) riveted or otherwise secured to the inner end of the cylinder 44 and is keyed to said segments by set-screws 49.

Referring to Figs. 1, 2 and 3, 50 designates a bail, one arm of which terminates in a hub 51 encircling the shaft A and key 15, while the other arm terminates in a ring 52 having a bearing on the cylinder 44. The ring 52 is equipped with a pair of cam followers in the form of inwardly extending pins 53 that enter a collar 54 inside the cylinder 44, said collar being locked to the long hub 14 by an annular rib 55 that lies within an annular groove 56 in the hub 14. The two pins 53 extend through the cam grooves 45 of the cylinder 44. The transverse member of the bail 50 is equipped with a handle 57. On the hub 51 of the bail 50 are oppositely extending arms 58 (Figs. 1 and 2) that are connected by links 59 with corresponding arms 60 on the ring 52 of the other cylinder 44, as clearly shown in Fig. 2.

Extending between the two pulleys is the connector belt 61 formed with tapered edges fitting the tapered faces of the two cone sections of each pulley.

Briefly describing the operation, assume that the shaft A is the driving shaft and the shaft B the driven shaft, with the belt 61 in the position shown in Figs. 1, 2 and 3. In this position of the parts it will be observed that the driving pulley on shaft A is fully expanded, and the driven pulley on shaft B is fully contracted. If, now, it is desired to increase the speed of the driven shaft B, the bail 50 is swung, and the engagement of the pins 53 with the cam slots 45 of the two drums 44 effects simultaneous endwise movements of the hubs 14 of the two shiftable pulley members. This effects an inward movement of the interlocked pulley sections 20, 21, 22 and 12 on the shaft A and a simultaneous outward movement of the pulley section 12 on the shaft B. This causes one loop of the belt to move outwardly into engagement with the pulley section 21 on shaft A and the opposite loop of the belt to simultaneously move inwardly into engagement with the pulley section 22 on shaft B. A further swing of the bail 50 in the same direction effects a further inward movement of sections 21, 22 and 12 on shaft A and an outward movement of section 22 on shaft B. This causes one loop of the belt to move further outwardly into engagement with section 22 on shaft A and the other loop to move further inwardly into engagement with section 21 on shaft B. At this point, in the construction shown, the driven shaft B rotates at a higher speed than the driving shaft A; and the maximum speed of the driven shaft B may be effected by a further swing of the bail 50 in the same direction, causing one loop of the belt to be shifted into driven engagement with the outer section 12 on shaft A and the other loop into driving engagement with the inner section 20 on shaft B. Manifestly, by then swinging the bail 50 backwardly or in the reverse direction, the speed of the driven shaft B is stepped down.

During these operations, as soon as the inner ring 20 reaches the position shown in Fig. 4, the locking pin 23 is cammed down into the hole 38 by the inclined rear side of the recess 33 in the next outlying ring 21. In the same way, as the rings 21, 22 and 12 are moved inwardly, the rings 21 and 22 are successively locked by their respective locking pins. The outer ring 12 is held locked in innermost position by the engagement of the pins 53 with the cam grooves 45, it being understood that in practice the bail 50 will be equipped with a suitable segment rack and locking dog (not shown) for holding it in any shifted position. By reference to Fig. 4 it will be observed that as each ring is shifted inwardly, it automatically holds the locking pin of the next inner ring in locking position; and as the rings are successively shifted outwardly, the heads of the locking pins, under the thrust of their respective springs, snap up into the locking recesses in the next outer rings, and are held there by the next inner rings and the shaft which block unlocking movement of the locking pins, as shown in Fig. 3.

In Fig. 6 I have illustrated a modification of the locking pin which has some advantages over the simple one-piece structure of locking pin shown in Figs. 3 and 4. Here the pin head and stem are made in two pieces 62 and 63, respectively, the head 62 slidably fitting the socket 64 and being urged outwardly by a coil spring 65. The upper end of the stem 63 has a sliding fit in a socket 66 in the head 62 and also a sliding fit at its lower end in a hole 67 in the bottom wall of the socket 64. A light thrust spring 68 confined between the top of the stem 63 and the end wall of the socket 66 urges the stem 63 downwardly. The head 62 and stem 63 are connected by a tie rod 69, the head 70 of which has a limited play in a socket 71 in the lower end of the stem 63. The rear edge of the locking hole 39 underlying the pin is preferably formed with an inclined approach 72 for the descent of the head 70 of the tie rod 69 as the pin moves into register with the hole 39. As soon as the pin registers with the hole 39, the spring 68 instantly forces it fully into engagement with the hole 39, and this irrespective of wear on the head 62. It will thus be seen that the function of the larger spring 65 is to withdraw the pin from the hole of the adjacent inner section of the pulley, or shaft, as the pulley expands and to force its head into the adjacent outer section of the pulley and hold it there until the pulley is again contracted, while the smaller spring 68 forces the pin into locking engagement with the underlying hole and compensates for wear.

From the foregoing it will be apparent that the device of the present invention renders practical the use of a narrow belt connector for the two pulleys and at the same time makes possible a wide variation in speed between the driving and driven pulleys, and also avoids such a steep cone formation as would make the shifting of the belt, when varying the speed, a difficult matter by reason of low cam efficiency. I have herein illustrated and described one practical physical embodiment of the principle of the invention, but it is evident that the structural details may be widely varied without departing from this principle or sacrificing any of the advantages secured by the invention. Hence, I do not limit the invention to the particular embodiment shown, but reserve all such variations, modifications and mechanical equivalents as fall within the spirit and purview of the appended claims.

I claim:

1. In a variable speed transmission of the type described, the combination of a shaft, a pair of pulley sections on said shaft formed with opposed tapered surfaces, one of said pulley sections comprising a group of concentric parts, means for locking the outermost part of said group against rotation relatively to said shaft, means for shifting said outermost part toward and from the opposed tapered surface of the other pulley section; all of said parts except the innermost having locking recesses in their inner peripheries, and said shaft and certain of said parts having locking holes in their outer peripheries, and outwardly spring pressed pins slidably mounted in all of said parts except the outermost, said pins at their outer ends engaging with said recesses to lock said parts together at the limits of their outward movements, and said pins at their inner ends engaging with said holes to lock said parts together at the limits of their inward movements.

2. A specific form of claim 1, wherein the outer ends of said pins have beveled engagement with their respective recesses whereby, as each part is moved inwardly, a locking pin carried thereby is forced inwardly into locking engagement with the hole in the next inner part or shaft.

3. In a variable speed transmission mechanism, the combination of parallel shafts, pulleys mounted on the respective shafts, each of said pulleys comprising a pair of mating pulley sections having opposed tapered belt-engaging faces, one section of each pulley being fast on its shaft, and the other section being keyed to and shiftable lengthwise of the shaft, a belt connecting said pulleys, single-grooved oscillatable cams mounted on each of said shafts and connected to said fixed sections, and manually operable means connecting said cams with said shiftable sections effective to simultaneously move said shiftable sections to equal extents in opposite directions relatively to their respective mating sections.

4. In a variable speed transmission mechanism, the combination of parallel shafts, pulleys mounted on the respective shafts, each of said pulleys comprising a pair of mating pulley sections having opposed tapered belt-engaging faces, one section of each pulley being fast on said shaft, the other section being splined to and shiftable length-wise of the shaft, one of the sections of each pulley comprising a plurality of shiftable concentrically nested parts, means for locking each part with the next adjacent part, a belt connecting said pulleys, single grooved oscillatable cam drums mounted on the respective shafts, a steadying bar connecting said drums together, and manually operable means connecting said drums with said shiftable sections effective to simultaneously move said shiftable sections to equal amounts in opposite directions relatively to their respective mating sections.

5. In a variable speed transmission mechanism, the combination of parallel shafts, pulleys mounted on the respective shafts, each of said pulleys comprising a pair of mating pulley sections having opposed tapered belt-engaging faces, one section of each pulley being fast on its shaft and the other section having a hub splined to and slidable lengthwise of the shaft, a stationary single-grooved cam mounted on said shaft, rings swiveled on the respective pulley hubs of said shiftable pulley sections, cam followers carried by said rings, and manually operable means for simultaneously rotating said rings.

6. A specific form of claim 5, wherein the slidable hub of each laterally shiftable pulley section is longitudinally slotted, and the hub of its mating section is recessed thereon and keyed to the shaft by radial pins extending through said longitudinal slots.

7. In a pulley structure having outer, intermediate and inner relatively slidable sections, a locking pin structure for locking said intermediate section to either of said outer and inner sections comprising a chambered head slidably mounted in said intermediate section, a stem at one end telescopingly engaged with the chamber of said head, a spring urging said head toward said outer section, a spring urging said stem toward said inner section, and a lost motion connection between said head and stem.

8. In a pulley structure having outer, intermediate and inner relatively slidable sections, a locking pin structure for locking said intermediate section to either of said outer and inner sections comprising a chambered head slidably mounted in said intermediate section, a stem at one end telescopingly engaged with the chamber of said head, a thrust spring encircling said stem and urging said head toward said outer section, a thrust spring in said chamber urging said stem toward said inner section, and a lost motion connection between said head and stem comprising a tie-rod extending lengthwise through said stem and at its outer end connected to said head and at its inner end formed with a head having movement limiting engagement with the inner end of said stem.

9. In an adjustable diameter pulley structure, a pair of sections having opposed inclined belt engaging faces, forming by relative axial adjustment, variable effective diameters, a shaft upon which said pulley sections are supported, one of said pulley sections having a plurality of concentric parts, means for moving the outermost part, a radial pin carried by the innermost part and adapted to be received in a recess in the shaft, and means operated by relative axial movement of the next concentric part for causing said pin to be moved out of the recess.

10. In an adjustable diameter pulley structure, a pair of sections having opposed inclined belt engaging faces, forming by relative axial adjustment, variable effective diameters, a shaft upon which said pulley sections are supported, one of said pulley sections having a plurality of concentric parts, means for moving the outermost part, and a radial pin carried by the innermost part and adapted to be received in a recess in the shaft, said recess being so located that the said innermost part locks in its nearest position to the opposed pulley section.

11. In an adjustable diameter pulley structure, a pair of sections having opposed inclined belt engaging faces, forming by relative axial adjustment, variable effective diameters, a shaft upon which said pulley sections are supported, one of said pulley sections having a plurality of concentric parts, means for moving the outermost part, radial pins for locking successive parts together, and means responsive to the arrival of the parts in succession to their nearest positions to the opposed pulley sections for urging the pins in succesion to locking positions.

12. In an adjustable diameter pulley structure, a pair of sections having opposed inclined belt engaging faces, forming by relative axial adjustment, variable effective diameters, a shaft upon which said pulley sections are supported, one of said pulley sections having a plurality of concentric parts, a drum concentric with the pulley structure and connected to the other pulley section to restrain its axial motion and to permit relative rotation of said other section, said drum having a groove, and means guided by the groove for moving the said one of said pulley sections in an axial direction.

JAN H. HOLLESTELLE.